US006832001B1

(12) United States Patent  
Kashiwagi

(10) Patent No.: US 6,832,001 B1
(45) Date of Patent: Dec. 14, 2004

(54) IMAGE PROCESSING APPARATUS AND METHOD

(75) Inventor: Kenichi Kashiwagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 774 days.

(21) Appl. No.: 09/712,269

(22) Filed: Nov. 15, 2000

(30) Foreign Application Priority Data

Nov. 16, 1999 (JP) ............................................. 11-325604

(51) Int. Cl.$^7$ .............................. G06K 9/00; G06K 9/36
(52) U.S. Cl. ......................... 382/166; 382/240; 382/128
(58) Field of Search ................................ 382/166, 117, 382/232, 234–253, 128; 375/240.02

(56) References Cited

U.S. PATENT DOCUMENTS

| 5,543,845 | A | * | 8/1996 | Asamura et al. | ....... | 375/240.02 |
| 5,553,160 | A | * | 9/1996 | Dawson | ...................... | 382/166 |
| 5,868,134 | A |   | 2/1999 | Sugiyama et al. | .......... | 128/630 |
| 6,201,897 | B1 | * | 3/2001 | Nixon | ......................... | 382/248 |
| 6,327,375 | B1 | * | 12/2001 | Matsumoto et al. | ........ | 382/117 |

FOREIGN PATENT DOCUMENTS

| JP | 6-154171 | 6/1994 | ............ A61B/3/14 |
| JP | 7-136121 | 9/1994 | ............ A61B/3/12 |

* cited by examiner

Primary Examiner—Leo Boudreau
Assistant Examiner—Duy M. Dang
(74) Attorney, Agent, or Firm—Fitzpatrick, Cella, Harper & Scinto

(57) ABSTRACT

Color information having R, G, B components is entered. When an optic nerve head contained in the color image information is designated by an image processor and region designation unit, an image compression unit encodes the B component, which is included among a plurality of color components in this designated region, at a compression rate lower than that in a region other than the designated region, and encodes the G component and the B component other than in the designated region at a higher compression rate.

19 Claims, 15 Drawing Sheets

FIG. 9A

| MH | TH0 | BS0 | HT1 | BS1 | ... | THn-1 | BSn-1 |

FIG. 9B

| IMAGE SIZE | TILE SIZE | NUMBER OF COMPONENTS | COMPONENT INFORMATION |

FIG. 9C

| TILE LENGTH | ENCODING PARAMETER | | BIT-SHIFT INFORMATION |

MASK INFORMATION

FIG. 9D

BIT PLANE S-1

| LL | HL2 | LH2 | ... |

BIT PLANE S-2

| LL | LL | HL2 | LH2 | HH2 | HL1 | LH1 | HH1 |

BIT PLANE 0

FIG. 10

| No. | PATIENT ID | NAME | PHOTOGRAPHED REGION | LEFT OR RIGHT EYE |
|---|---|---|---|---|
| 1 | 001234 | TARO YAMADA | 19990601 | R |
| 2 | 005583 | RYOKO SATO | 19990620 | L |
| . | . | . | . | . |
| . | . | . | . | . |
| . | . | . | . | . |

IMAGE PROCESSING APPARATUS AND METHOD

FIELD OF THE INVENTION

This invention relates to an image processing apparatus and method for inputting and encoding a fundus image.

BACKGROUND OF THE INVENTION

Medical images used in patient examination and the like can now be handled as digital data. In order to archive efficiently large quantities of medical image data generated daily, the usual practice at many clinical locations is to put the image data into electronic form, compress and store it. In view of this tendency, compression schemes suited to medical images are being studied. For example, a multilevel reversible compression method such as JPEG-LS is known as a method of compression suited to medical images.

However, in special images such as an image of the fundus of the eye, reversible compression is not necessarily appropriate in certain cases. The reason for this is that since a fundus image is one in which the region photographed, namely the fundus of the eye under examination, is stationary, an imbalance appears in the color characteristic of the subject and color information is not dispersed uniformly in each of the R, G, B color components of the recorded digital image. Accordingly, color planes that contain a great deal of unnecessary information are also contained in this information. In view of the increasing number of photographs of such medical images, it would be helpful if even a few more images could be stored on an effective recording medium without sacrificing information that is vital for analysis. This can be achieved by not storing the image information of all color components.

With the conventional reversible compression scheme mentioned above, it is customary for the image data of one screen to be compressed at the same resolution. However, this is not necessarily appropriate for a special image such as a fundus image. The reason for this is that a fundus image contains important regions that are essential for diagnosis, one such region being the optic nerve head. The head of an optic nerve is a portion of interest when judging the progress of a glaucoma, which is a typical eye disease, and it is necessary to closely scrutinize the condition of the capillary vessels by checking the state of travel of the capillary vessels in the interior of this region. When a diagnosis is made on the basis of the capillaries, a key point is the extent to which fine blood vessels can be observed and discovered because this can lead to early discovery and treatment of diseases.

Accordingly, although the original data must not be lost at the time of image compression with regard to image information corresponding to important regions of the kind described above, in other regions it will suffice to merely ascertain the state of intersection or meander of blood vessels that have at least a certain diameter; these regions do not require a high-resolution image. This means that by storing important regions of a fundus image and regions that are not so important upon compressing them at different compression rates, the image can be compressed at a higher compression rate overall so that the amount of encoded image data stored can be reduced.

An object of the present invention is to provide an image processing apparatus and method through which a designated region of an image can be encoded at a low compression rate and other regions at a high compression rate to thereby raise the encoding efficiency of the image as a whole.

Another object of the present invention is to provide an image processing apparatus and method in which a first color component of a designated region of an image can be encoded at a low compression rate and other color components at a high compression rate to thereby raise the encoding efficiency of the image as a whole.

SUMMARY OF THE INVENTION

According to the present invention, the foregoing object is attained by providing an image processing apparatus for encoding image information, comprising: input means for inputting image information of a plurality of color components; designation means for designating a prescribed region in the image information; and encoding means for encoding a first color component included in a plurality of color components of the prescribed region designated by the designation means, and encoding a second color component, which is included in the plurality of color components, and the first color component other than in the prescribed region at a compression rate higher than that of the first color component of the prescribed region.

Further, according to the present invention, the foregoing object is attained by providing an image processing met hod for encoding image information, comprising: an input step of inputting image information of a plurality of color components; a designation step of designating a prescribed region in the image information; and an encoding step of encoding a first color component included in a plurality of color components of the prescribed region designated at the designation step, and encoding a second color component, which is included in the plurality of color components, and the first color component other than in the prescribed region at a compression rate higher than that of the first color component of the prescribed region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 9A to 9D are schematic views representing the structure of a code sequence generated and output by SNR scalability;

FIG. 10 is a diagram illustrating an example of a display on a selection screen displayed on a monitor when a desired fundus image is selected from an image recording unit;

DESCRIPTION OF THE PREFERRED EMBODIMENTS

Preferred embodiments of the present invention will now be described in detail with reference to the accompanying drawings.

Figure 1:
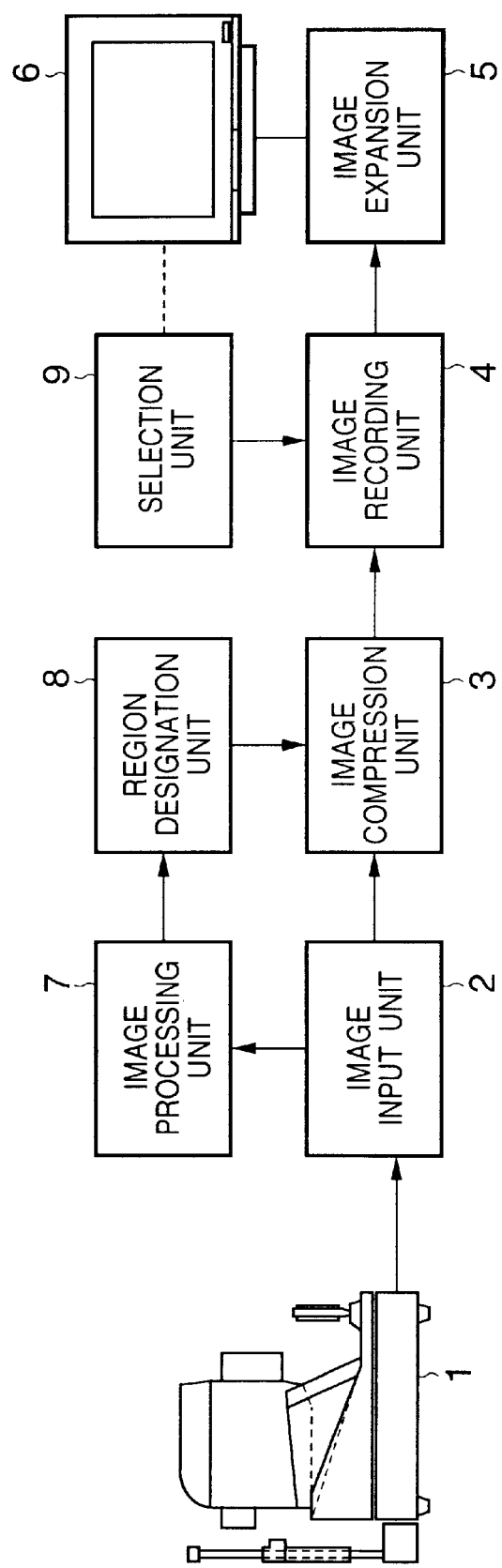
FIG. 1 is a block diagram illustrating the construction of a fundus image processing apparatus according to an embodiment of the present invention.
Figure 2:
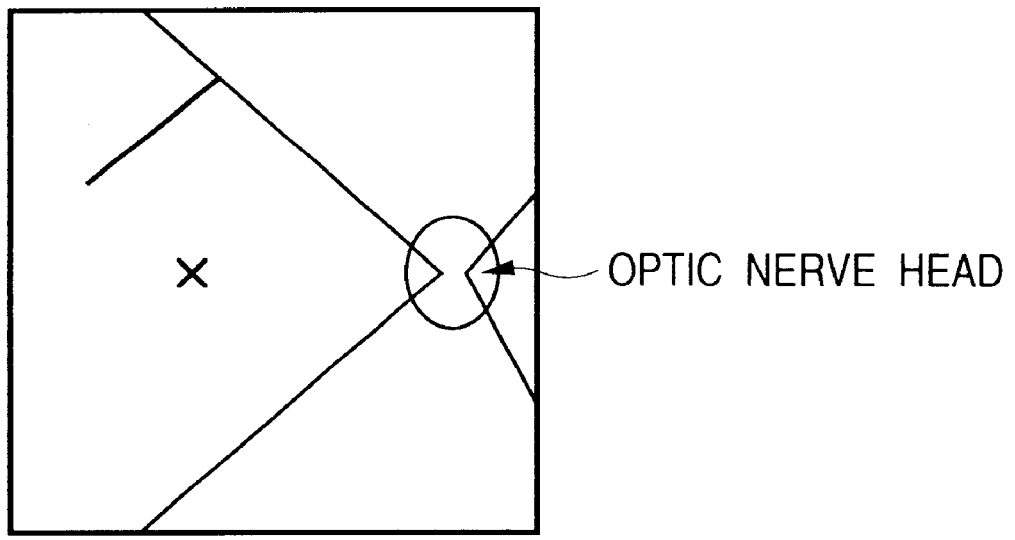
FIG. 2 is a diagram illustrating an example of a fundus image.

FIG. 1 is a block diagram illustrating the construction of a fundus image processing apparatus according to an embodiment of the present invention.

As shown in FIG. 1, the apparatus includes a fundus camera 1, an image input unit 2, an image compression unit 3, an image recording unit 4, an image expansion unit 5, a monitor 6, an image processing unit 7, a region designation unit 8 and a selection unit 9.

The fundus camera 1 captures the image of the fundus of an eye under examination in response to pressing of a photographic switch (not shown) upon completion of photographic preparations such as positioning of the eye. The fundus image signal captured by a CCD camera (not shown) within the fundus camera 1 by this photographic operation is input to the image input unit 2 in the order of raster scanning. The image input unit 2 outputs this fundus image signal to the image compression unit 3 and image processing unit 7.

The image signal output from the image input unit 2 to the image compression unit 3 is a multilevel signal composed of the three primary colors R, G, B. The B (blue) image signal among the R, G, B components does not contain useful information requiring high resolution insofar as the region other than the optic nerve head extracted by the image processing unit 7 is concerned. This is a characteristic that arises from the color balance peculiar to a fundus image and is ascribable to the fact that since white spots or the like which may occur as a pathological change have a constant size, they are not affected by the degree of compression.

Figure 3:
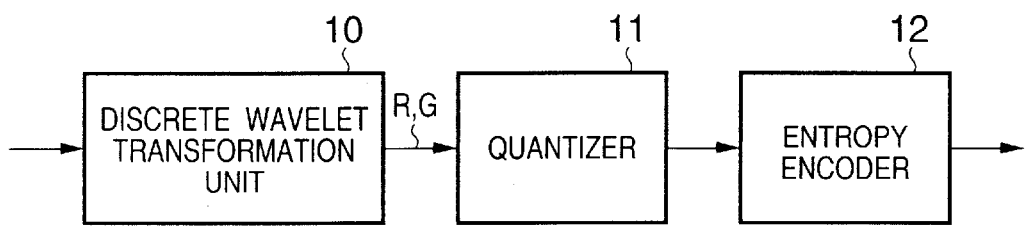
FIG. 3 is a block diagram showing the construction of an image compressing section according to this embodiment.

FIG. 3 is a block diagram illustrating the construction of the image compression unit 3.

As shown in FIG. 3, a discrete wavelet transformation unit 10 subjects the input image signal to a two-dimensional discrete wavelet transform, calculates the transformation coefficients and outputs the same.

Figure 4A:
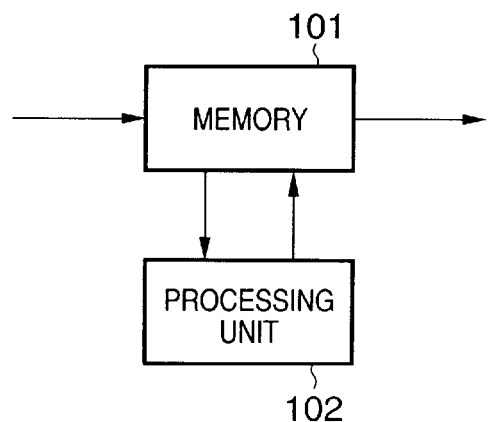
FIGS. 4A to 4C are diagram useful in describing the construction of a wavelet transformation unit and subbands obtained by a wavelet transformation according to this embodiment.
Figure 4B:
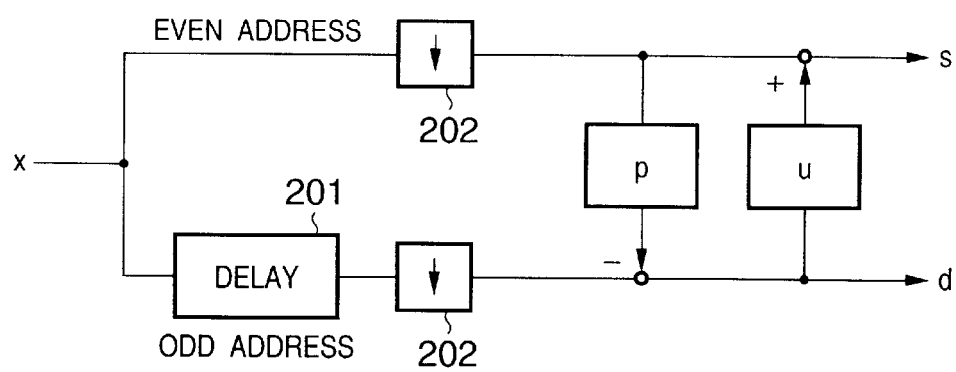
Figure 4C:
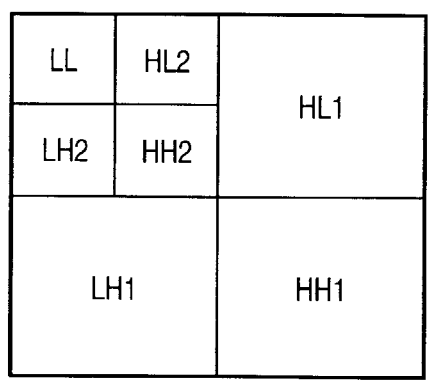

FIGS. 4A to 4C are diagrams useful in describing the basic construction of the discrete wavelet transformation unit 10.

As shown in FIG. 4A, the entered image signal is stored in a memory 101. The image signal is read out of the memory 101 successively and transformed by a processor 102, after which the transformed signal is written to the memory 101 again. In this embodiment, the processor 102 implements processing as shown in FIG. 4B. Here the entered image signal is separated into signals of even and odd addresses by a combination of a delay element 201 and downsamplers 202, and filter processing is applied by two filters p and u. Characters s and d represent low-pass and high-pass coefficients, respectively, when each one-dimensional image signal has been subjected to one level of decomposition. Assume that these coefficients are calculated in accordance with the following equations:

$$d(n)=x(2\times n+1)-\text{floor}[\{x(2\times n)+x(2\times n+2)\}/2] \quad (1)$$

$$s(n)=x(2\times n)+\text{floor}[\{d(n-1)+d(n)\}/4] \quad (2)$$

where x(n) represents an image signal that is to be transformed. In the above equations, floor[X] represents the largest integral value that does not exceed X.

By virtue of the processing set forth above, one-dimensional discrete wavelet transform processing is applied to the image signal. A two-dimensional discrete wavelet transform implements a one-dimensional discrete wavelet transformation successively in horizontal and vertical directions of an image. As the details of this processing is well known, the processing will not be described here.

FIG. 4C is a diagram illustrating an example of a group of transformation coefficients of two levels obtained by two-dimensional discrete wavelet transform processing. The image signal is decomposed into coefficient sequences HH1, HL1, LH1, LH2, HH2, HL2, LL of different frequency bands. These coefficient sequences shall be referred to as "subbands" in the description that follows. The coefficients of each of the subbands of R (red), G (green) and B (blue) planes are output to a succeeding quantizer 11. The signal relating to the B (blue) plane is input to the image processing unit 7, where region extraction processing and mask processing, described later, is executed.

The fundus image signal input to the image processing unit 7, where the region corresponding to the optic nerve head is extracted. The optic nerve head differs from other parts of the fundus and possesses a high reflectivity, as a result of which it can be extracted with ease based upon the difference in luminance. More specifically, extraction of the region corresponding to the optic nerve head can be carried out by a method of segmenting the image signal of the R (red) planes using a threshold value that makes it possible to distinguish between an optic nerve head and a retinal portion, or by a method of converting RGB information to H (hue), saturation (S) and I (illuminance) information and extracting the high-luminance optic nerve head from the illuminance information.

A detailed method of extracting a region corresponding to an optic nerve head is disclosed in, e.g., the specifications of Japanese Patent Application Laid-Open Nos. 6-154171 and 7-136121.

Figure 5:
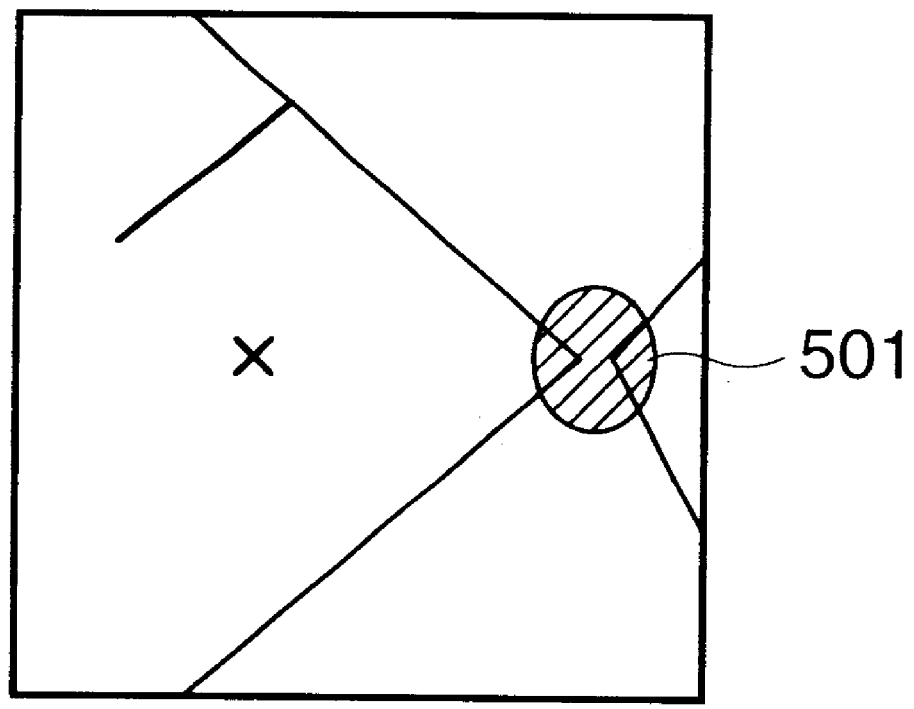
FIG. 5 is a diagram showing an example of a fundus image according to this embodiment.

FIG. 5 is a diagram illustrating an example of the position of an optic nerve head thus extracted. The extracted optic nerve head is indicated at 501.

The information concerning the optic nerve head is sent to the region designation unit 8. In the B (blue) planes of the image to be encoded, a region of interest (ROI) that is to be decoded at an image quality higher than that of its surroundings is decided by the region designation unit 8, and mask information indicating which coefficients belong to the designated region is generated by the region designation unit 8 when the image of interest is subjected to the discrete wavelet transform.

Figure 6A:
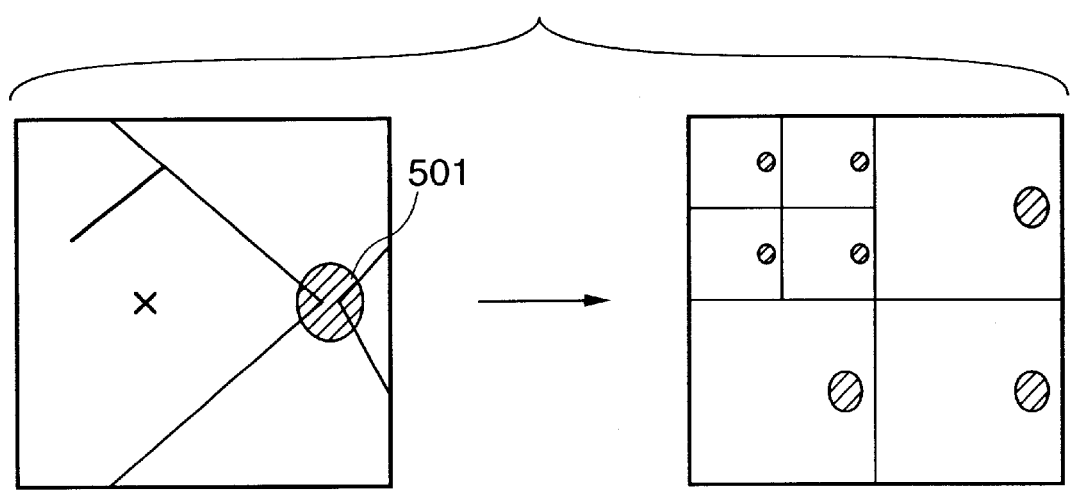
FIGS. 6A to 6C are diagrams useful in describing the transformation of a designated region in an image and a bit shift of image data in the designated region.

FIG. 6A illustrates an example of a case where mask information is generated.

Position information indicating the optic nerve head 501 that has entered from the image processing unit 7 is recognized as an ROI, as indicated on the left side of FIG. 6A. The region designation unit 8 calculates the portion of each subband occupied by this designated when the image which contains this designated region is subjected to the discrete wavelet transform. The region indicated by the mask information is a domain, which includes the transform coefficients of the surroundings, necessary when decoding the image signal on the boundary of the designated region.

Figure 6B:
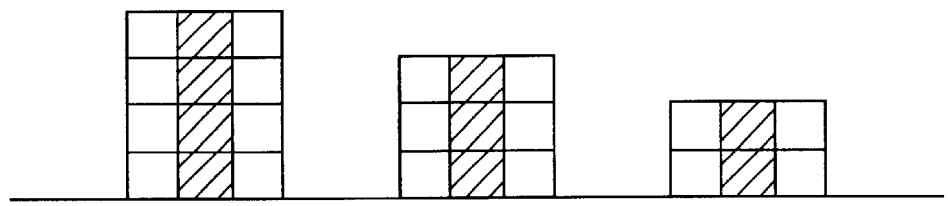

An example of the mask information thus calculated in shown on the right side of FIG. 6A. In this example, mask information for when a two-level two-dimensional discrete wavelet transform is applied to the fundus image containing the optic nerve head 501 on the left side of FIG. 6A is calculated a shown on the right side of FIG. 6A. In FIG. 6B, the bits constituting the mask information of the optic nerve head 501 are "1"s and the bits of the other mask information are "0"s. The entirety of this mask information is identical with the constitution of the transform coefficients obtained by the two-dimensional discrete wavelet transform. By scanning the bits within the mask information, therefore, it is possible to identify whether the coefficients at the corresponding positions fall within the designated region. The mask information thus produced is applied to the quantizer 11 of the image compression unit 3.

Furthermore, the region designation unit 8 receives an input of a parameter, which specifies the image quality of the designated region, from input means, not shown. The parameter may be a numerical value expressing a compression rate assigned to the designated region, or a numerical value representing the image quality of this region. On the basis of this entered parameter, the region designation unit 8 calculates a bit-shift quantity B for the coefficients in the designated region and outputs this to the quantizer 11 together with the mask of FIG. 6A.

The quantizer 11 quantizes the entered coefficients by a predetermined quantization step and outputs indices corresponding to the quantized values. Quantization is carried out in accordance with the following equations:

$$q = \text{sign}(c)\text{floor}\{abs(c)/\Delta\} \quad (3)$$

$$\text{sign}(c) = 1; c \geq 0 \quad (4)$$

$$\text{sign}(c) = -1; c < 0 \quad (5)$$

where c represents a coefficient that undergoes quantization. Further, in this embodiment, it is assumed that "1" is included as a value of the quantization step $\Delta$. When the value is "1", quantization is not actually carried out. In regard to the R (red) and G (green) planes, the transformation coefficients that have been input to the quantizer 11 are output as is to a succeeding entropy encoder 12. The B (blue) planes are subjected to the processing set forth below.

The quantizer 11 changes the quantization indices in accordance with the following equations based upon the mask and shift quantity B that have entered from the region designation unit 8:

$$q' = q \times 2^B; m = 1 \quad (6)$$

$$q' = q; m = 0 \quad (7)$$

where m represents the value of a mask at the position of the quantization index. By virtue of the processing described above, only a quantization index that belongs to the designated optic nerve head 501 is shifted up by B bits in the region designation unit 8.

Figure 6C:
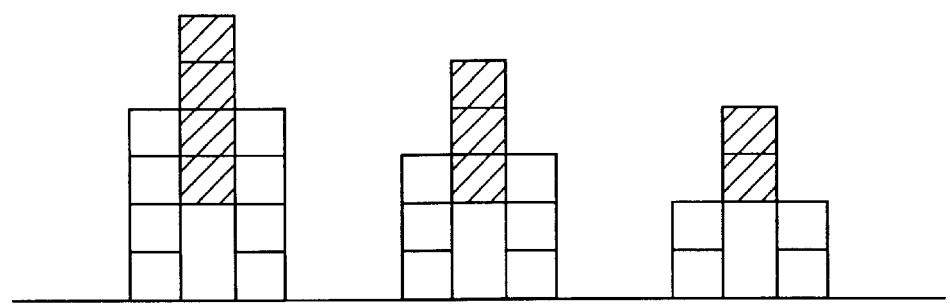

FIGS. 6B and 6C illustrate a change in quantization index by such shift-up.

In FIG. 6B, three quantization indices exist in three subbands. If the value of mask information of a quantization index that has been solidly shaded is "1" and the number B of shifts is "2", then the quantization indices after the shift will be as shown in FIG. 6C.

The quantization indices that have been changed in this manner are output to the succeeding entropy encoder 12. The entropy encoder 12 decomposes the quantization indices input from the quantizer 11 into bit planes, applies binary arithmetic encoding on a per-bit-plane basis and outputs a code stream.

Figure 7:
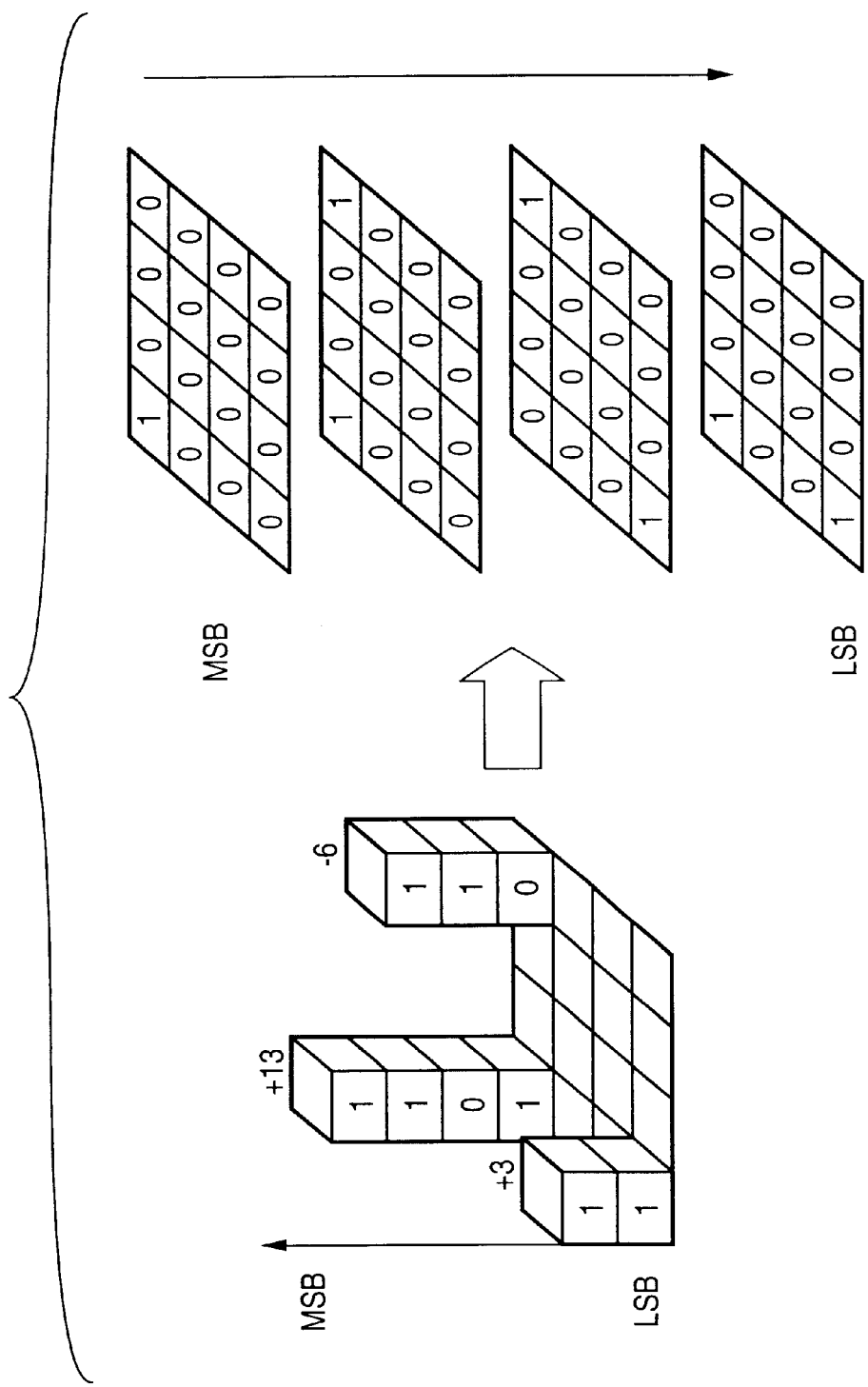
FIG. 7 is a diagram useful in describing the operation of an entropy encoder according to this embodiment.

FIG. 7 is a diagram useful in describing the operation of the entropy encoder 12 according to this embodiment. In this embodiment, three non-zero quantization indices exist in a region within a subband having a size of 4×4, and the values of these indices are "+13", "−6" and "+3". The entropy encoder 12 obtains a maximum value M by scanning this region and, in accordance with the following equation, calculates a number S of bits necessary to express the maximum quantization index:

$$S = \text{ceil}[\log_2\{abs(M))\}] \quad (8)$$

where ceil(x) represents the smallest integral value that is greater than x.

In FIG. 7, the maximum coefficient value is "13" and therefore the value of the bit count S is "4" and the 16 quantization indices in the sequence are processed in units of the four bit planes, as shown on the right side of FIG. 7. First, the entropy encoder 12 applies binary arithmetic encoding to each bit of the most significant bit plane (represented by MSB in FIG. 4) and outputs the encoded bits as a bit stream. Next, the bit plane is lowered by one level and the process is repeated. This processing is repeated until the bit plane of interest reaches the least significant bit plane (represented by LSB in FIG. 7), with each bit of the bit planes being encoded, output to and recorded by the image recording unit 4. When the first non-zero bit is detected in the scanning of the bit planes, then the code of this quantization index undergoes entropy encoding immediately thereafter.

FIGS. 8A to 8D are schematic views representing the structure of a code sequence thus compressed and output by the image compression unit 3.

Figure 8A:
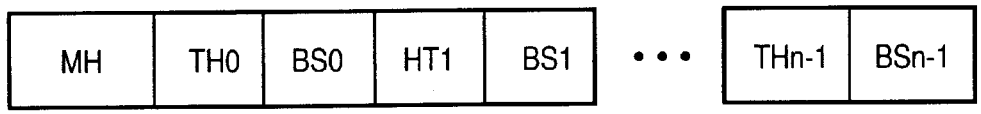
FIGS. 8A to 8D are schematic views representing the structure of a code sequence generated and output by spatial scalability.
Figure 8B:
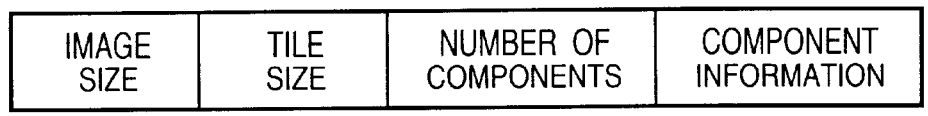

FIG. 8A illustrates the structure of an overall code sequence, in which MH represents a main header, TH a tile header and BS a bit stream. As shown in FIG. 8B, the main header MH possesses the size of the image to be encoded (namely the numbers of pixels in the horizontal and vertical directions of the image), tile size for when the image is divided into a plurality of tiles constituting rectangular areas, number of components representing the number of each of the color components, and component information representing the size and bit precision of each component. Since an image is not divided into tiles in this embodiment, the size and image size take on identical values. In a case where the image of interest is a monochrome multilevel image, the number of components is one.

The structure of the tile header TH is shown in FIG. 5C. The tile header TH includes tile length, which contains the bit-stream length and header length of the particular tile, an encoding parameter for the tile, mask information indicating the designated region, and number of bit shifts of the coefficients that belong to this region. It should be noted that the mask information indicating the designated region and the number of bit shifts of the coefficients belonging to this region are implemented solely for the B (blue) planes.

Here the encoding parameter includes the level of the discrete wavelet transform, the type of filter, etc.

FIG. 5D illustrates the structure of a bit stream in this embodiment. Bit streams are collected on a per-subband basis and are arranged in order of increasing resolution, starting from the subband for which resolution is lowest. Furthermore, in each subband, codes are arrayed on a per-bit-plane basis from a high-order bit plane to a low-order bit plane. By thus arraying the codes, it is possible to perform hierarchical decoding shown in FIGS. 14A and 4B, described later.

FIGS. 9A to 9D are schematic views representing the structure of a code sequence generated and output by the image compression unit 3.

FIG. 9A illustrates the structure of an overall code sequence, in which MH represents a main header, TH a tile header and BS a bit stream. As shown in FIG. 9B, the main header MH possesses the size of the image to be encoded (namely the numbers of pixels in the horizontal and vertical directions of the image), tile size for when the image is divided into a plurality of tiles constituting rectangular areas, number of components representing the number of each of the color components, and component information representing the size and bit precision of each component. Since an image is not divided into tiles in this embodiment, the tile size and image size take on identical values. In a case where the image of interest is a monochrome multilevel image, the number of components is one.

The structure of the tile header TH is shown in FIG. 9C. The tile header TH includes tile length, which contains the bit-stream length and header length of the particular tile, an encoding parameter for the tile, mask information indicating the designated region, and number of bit shifts of the coefficients that belong to this region.

It should be noted that the mask information indicating the designated region and the number of bit shifts of the coefficients belonging to this region are implemented solely for the B (blue) planes.

Here the encoding parameter includes the level of the discrete wavelet transform, the type of filter, etc.

FIG. 9D illustrates the structure of a bit stream in this embodiment. Bit streams are collected on a per-bit-plane basis and are arranged from a high-order bit plane (S−1) to a low-order bit plane. In each bit plane the results of encoding the bit plane of the quantization indices in each subband are arranged successively on a per-subband-basis. In FIG. 9D, S represents the number of bits necessary to express the largest quantization index. The code sequences thus generated are output to the image recording unit 4.

By thus arraying the codes, it is possible to perform hierarchical decoding of the kind shown in FIGS. 15A, 15B, described later.

In the embodiment described above, the compression rate of the overall image to be encoded can be controlled by changing the quantization step A.

In an alternative method according to this embodiment, the low-order bits of a bit plane to be encoded in the entropy encoder 12 can also be limited (discarded) in conformity with the required compression rate. In this case, all bit planes are not encoded; encoding is carried out from the high-order bit plane to bit planes the number of which conforms to the desired compression rate and the result is included in the final code sequence.

If the function for limiting the low-order bit planes of the B (blue) planes is utilized, only bits corresponding to the designated region (the optic nerve head) are included in the code sequence in large quantity, as shown in FIGS. 6A to 6C. In other words, it is possible to encode only the designated region, at a low compression rate, as an image having a high image quality.

A procedure through which an encoded fundus image that has been recorded in the image recording unit 4 in the manner set forth above is displayed on the monitor 6 will now be described.

The image that has been recorded in the image recording unit 4 is output to the image expansion unit 5 after it has been selected by the selection unit 9 of FIG. 1. By way of example, the selection is implemented by using a keyboard or pointing device, etc., to designate an item name or icon, etc., displayed on the monitor 6.

FIG. 10 is a diagram illustrating an example of an image selection screen of the selection unit 9. FIG. 10 shows an example of a selection screen displayed on the monitor 6.

Image-related information such as patient ID and name is set at the time of information input performed in association with photography by the fundus camera 1, and this information is recorded in the image recording unit 4 together with encoded image information. Methods of image selection include a method of directly entering a number that has been assigned to the information, a method of selecting/deciding an image by moving a cursor (not shown) up or down on the screen of the monitor 6, or a method of making the selection after narrowing down the target images based upon information such as patient ID and date of photography.

The image information that has thus been selected and then read out of the image recording unit 4 is input to the image expansion unit 5, where the bit stream that has been encoded is decoded. The decoding method will be described below.

Figure 11:
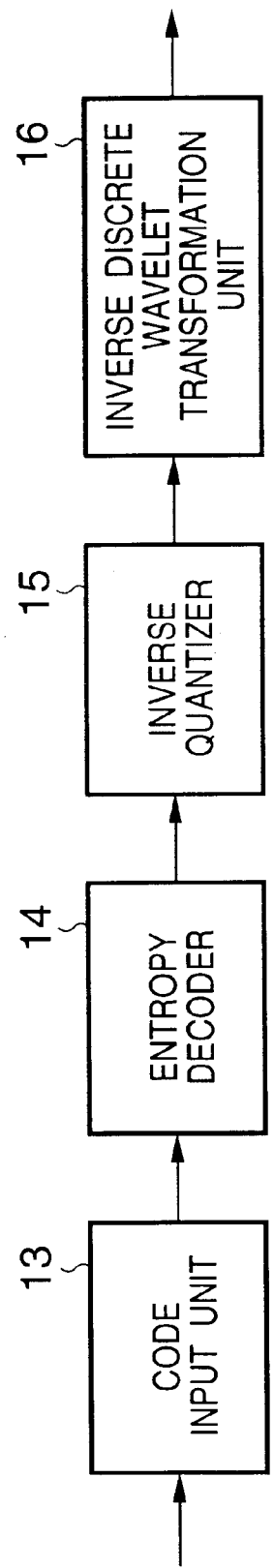
FIG. 11 is a block diagram illustrating the construction of an image decoding apparatus according to this embodiment.

FIG. 11 is a block diagram illustrating the construction of the image expansion unit 5 according to this embodiment. The image expansion unit 5 includes a code input unit 13, an entropy decoder 14, an inverse quantizer 15 and an inverse discrete wavelet transformation unit 16.

The code input unit 13 inputs a code sequence that has been read out of the image recording unit 4, analyzes the header contained in this code sequence and extracts the parameter necessary for subsequent processing. If necessary, the code input unit 13 controls the flow of processing or sends the particular parameter to a succeeding processing unit. Further, the bit stream contained in the code sequence is output to the entropy decoder 14.

The entropy decoder 14 subjects the bit stream to decoding on a per-bit-plane basis and outputs the result. The decoding procedure at such time is illustrated in FIG. 12.

Figure 12:
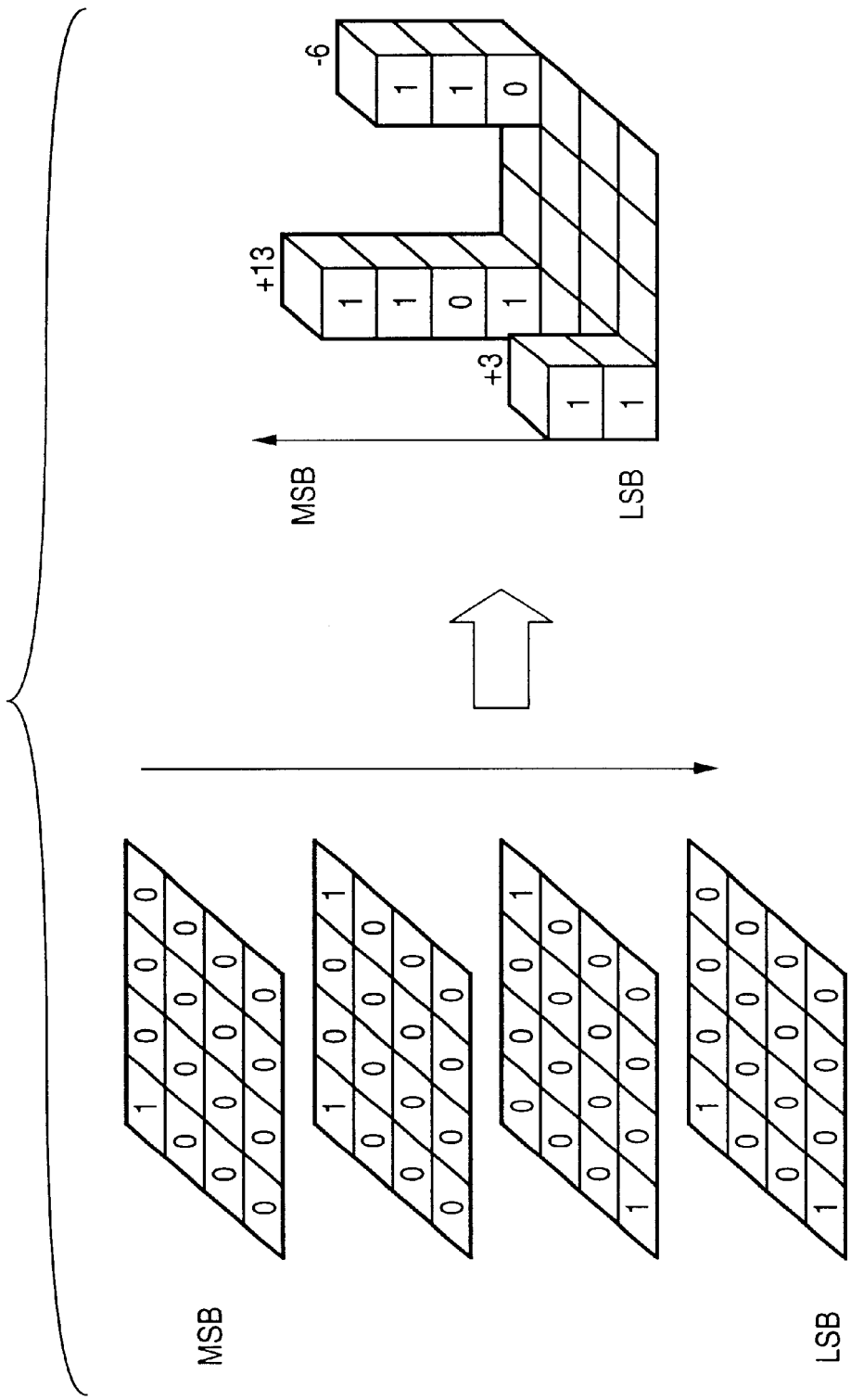
FIG. 12 is a diagram useful in describing bit planes and the order of decoding of the bit planes in accordance with an entropy decoder according to this embodiment.

FIG. 12 illustrates the flow through which one region of a subband to be decoded is successively decoded on a per-bit-plane basis and quantization indices are finally decoded. The bit planes are decoded in the order indicated by the arrow in FIG. 12. The quantization indices that have been decoded by the entropy decoder 14 are output to the inverse quantizer 15.

The inverse quantizer 15 decodes discrete wavelet transform coefficients from the entered quantization indices in accordance with the following equations:

[In case of the R (red) and G (green) planes]

$$c' = \Delta \times q/2^U; q \neq 0 \quad (9')$$

$$c' = 0; q = 0 \quad (10')$$

[In case of the B (blue) planes]

$$c' = \Delta \times q/2^U; q \neq 0 \quad (9)$$

$$c' = 0; q = 0 \quad (10)$$

$$U = B; m = 1 \quad (11)$$

$$U = 0; m = 0 \quad (12)$$

where q represents a quantization index and $\Delta$ a quantization step. The quantization step $\Delta$ has a value the same as that used when encoding was performed. Further, B represents a bit-shift count read out of the tile header, m denotes the value of a mask at the position of the particular quantization index, and c' represents a decoded transformation coefficient. This is obtained by decoding a coefficient represented by s or d at the time of encoding. The transformation coefficient c' is output to the 16 inverse discrete wavelet transformation unit 604.

Figure 13A:
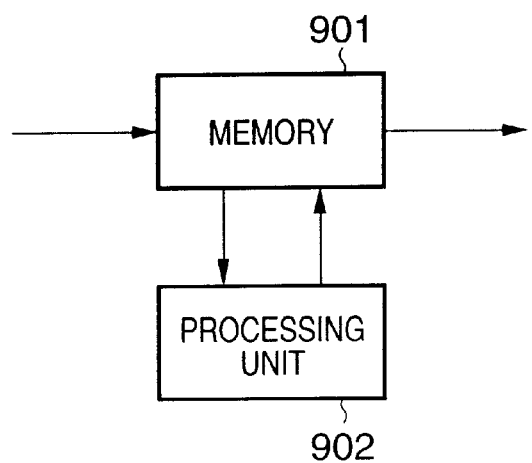
FIGS. 13A and 13B are block diagrams illustrating the construction of a wavelet decoder according to this embodiment.
Figure 13B:
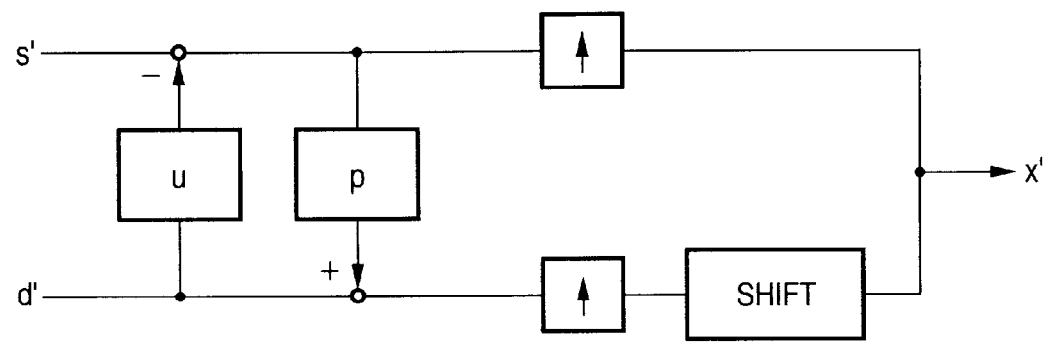

FIGS. 13A and 13B are block diagrams illustrating the construction and processing of the inverse discrete wavelet transformation unit 16.

In FIG. 13A, entered transformation coefficients are stored in a memory 901. A processing unit 902 implements a one-dimensional inverse discrete wavelet transform, reads the transformation coefficients out of the memory 901 successively and performs processing, thereby executing a two-dimensional inverse discrete wavelet transform. A two-dimensional inverse discrete wavelet transform is implemented through a procedure that is the reverse of the forward transform. The details of this are well known and need not be described. FIG. 13B shows processing blocks of the processing unit 902. Here the entered transformation coefficients are subjected to the processing of the two filters u and p. After upsampling is performed, the coefficients are superimposed and the processing block outputs an image signal x'. These processes are executed in accordance with the following equations:

$$x'(2 \times n) = s'(n) - \text{floor}[\{d'(n-1) + d(n)\}/4] \quad (13)$$

$$x'(2 \times n+1) = d'(n) - \text{floor}[\{x'(2 \times n) + x'(2 \times n+2)\}/2] \quad (14)$$

Here the discrete wavelet transforms in the forward and reverse directions in accordance with Equations (1), (2) and Equations (13), (14) satisfy the conditions for full reconstruct ion. In this embodiment, therefore, if the quantization step $\Delta$ is "1" and all bit planes have been decoded in the decoding of the bit planes, the decoded signal x' will agree with the signal x representing the original image.

By virtue of the above-described processing, an image is decoded and output to the monitor 6. Here an example is illustrated in which the image is output to and displayed on the monitor 6. However, this does not impose any limitation. For example, an arrangement may be adopted in which the image is output to a printer or to a storage device such as a magnetic disk.

Figure 14A:
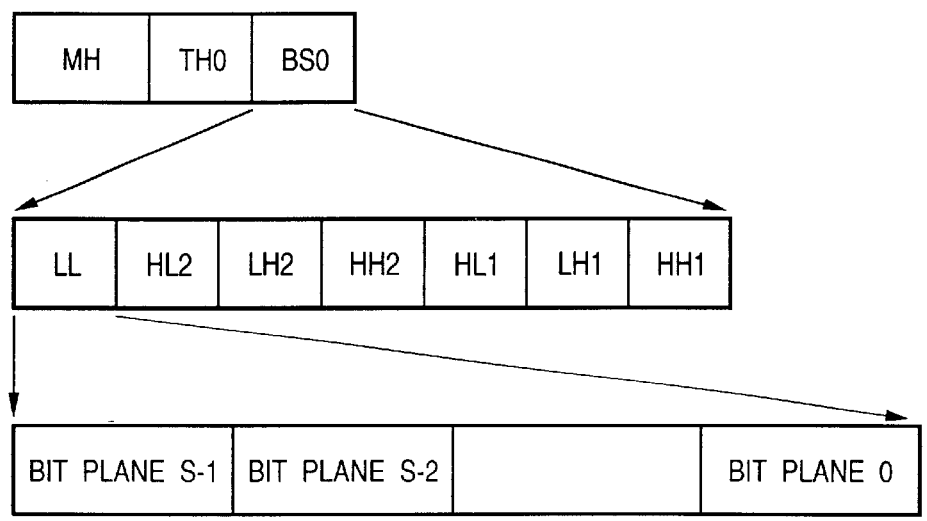
FIGS. 14A and 14B are diagrams useful in describing an example of a code sequence in case of spatial scalability, each subband when the code sequence is decoded, the sizes of an image displayed in correspondence with subbands, and a change in reproduced images that accompanies the decoding of the code sequence of each subband.
Figure 14B:
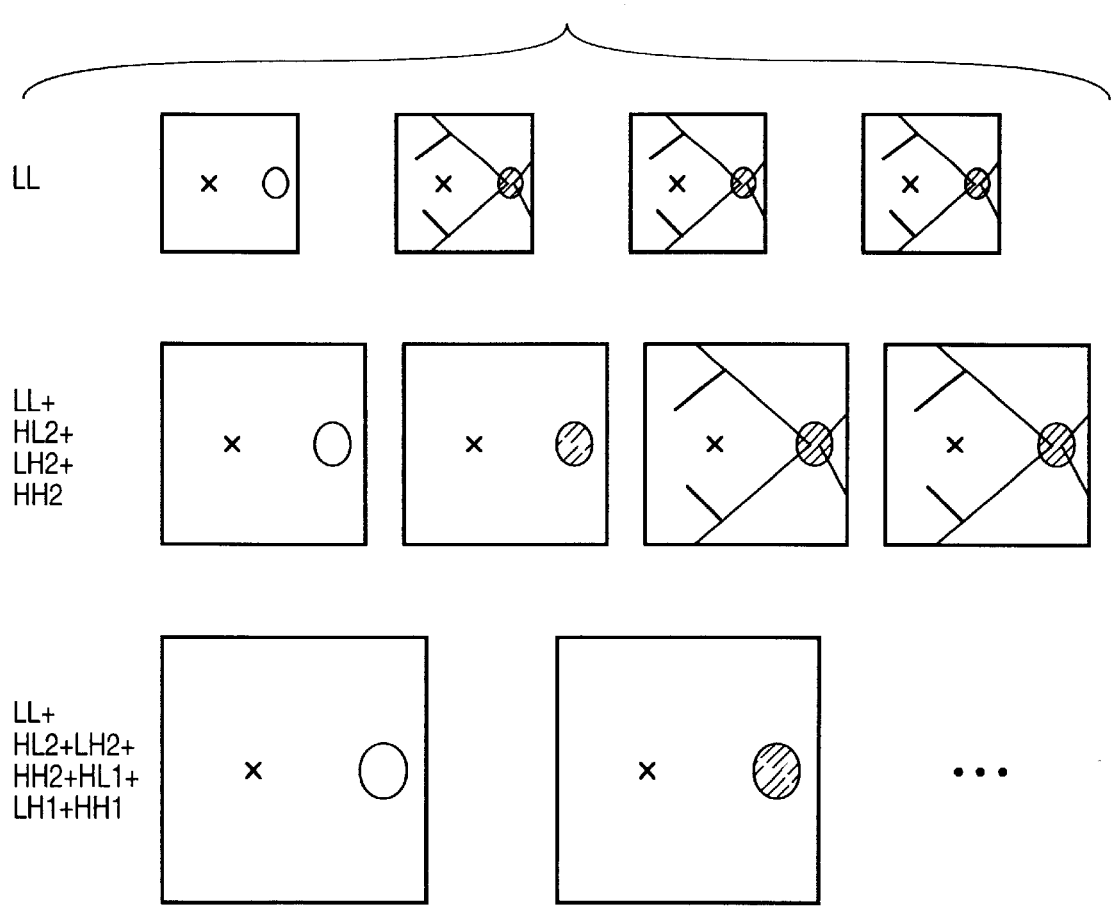

Reference will be had to FIGS. 14A and 14B to describe the form in which an image is displayed when an image is decoded and displayed by the procedure set forth above.

FIG. 14A is a diagram illustrating an example of a code sequence, in which the basic structure is based upon FIGS. 8A to 8D. Here the overall image has been set as a tile and therefore the code sequence includes a single tile header TH0 and bit stream BS0. The bit stream BS0 includes code arrayed in order of increasing resolution starting from LL, which is the subband that corresponds to the lowest resolution, HL2, LH2, . . . , and so on. Furthermore, in the case of the B (blue) planes, codes are arrayed in each subband on a per-bit-plane basis from a high-order bit plane (S-1) to a low-order bit plane.

The image expansion unit 5 reads in the bit stream in successive fashion starting from the low resolutions and displays an image when code corresponding to each bit plane has been decoded. FIG. 14B illustrates the correspondence between each subband and the size of a displayed image as well as a change in the image that accompanies the decoding of the code sequence within the subband in the case of the B (blue) planes. It will be understood from FIG. 14B that the code sequence corresponding to LL is read out successively and that image quality gradually improves as the decoding processing of each bit plane progresses. At this time the optic nerve head 501 that was the designated region at the time of encoding is reconstructed with an image quality higher than that of other portions.

The reason for this is as follows: The quantization indices that belong to the region of the image designated by the region designation unit 8 are shifted up in the quantizer 11 at the time of quantization. At the decoding of a bit plane, therefore, the quantization indices are decoded at an earlier time than in the other portions of the image. The decoding of the designated region at a high image quality in this manner is similar for other resolutions.

Furthermore, when all bit planes have been decoded, the designated region and the other portions of the image are identical in terms of image quality. However, in a case where decoding is suspended in mid-course, an image in which the designated region has been reconstructed to have an image quality higher than other portions will be obtained.

Figure 15A:
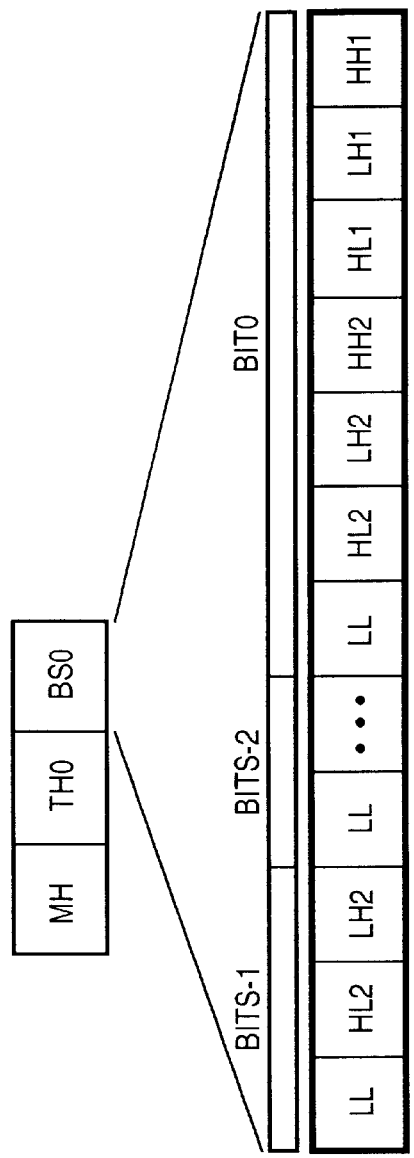
FIGS. 15A, 15B are diagrams useful in describing an example of a code sequence and the decoding processing thereof in case of SNR scalability.
Figure 15B:
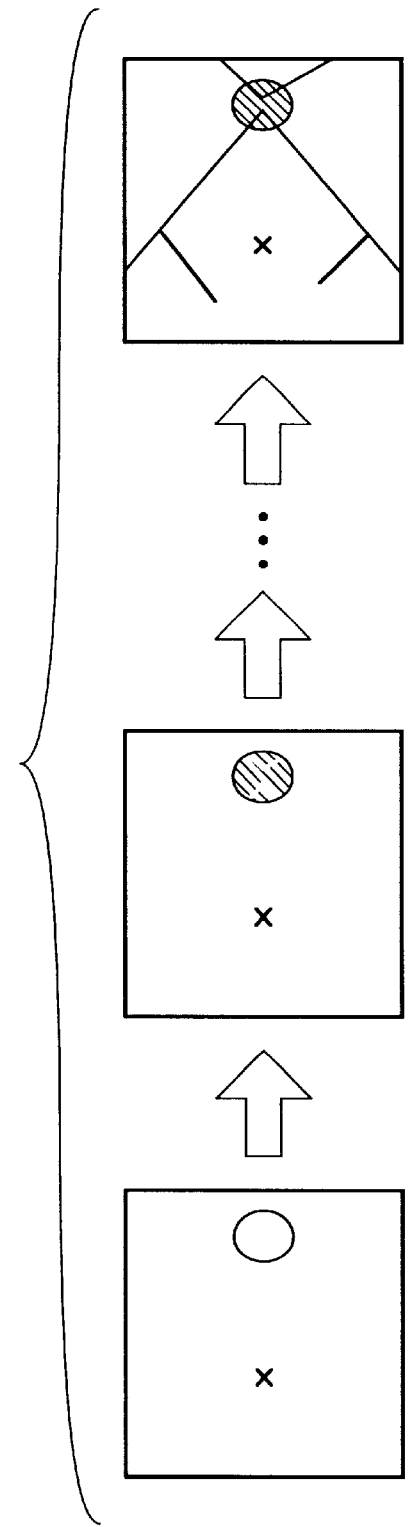

Reference will be had to FIGS. 15A and 15B to describe the form in which an image is displayed when an image is decoded and displayed through the procedure set forth above.

FIG. 15A is a diagram illustrating an example of a code sequence, in which the basic structure is based upon FIGS. 9A to 9D. Here the overall image has been set as a tile and therefore the code sequence includes a single tile header and bit stream. A bit stream BS0 includes code arrayed in order from the highest-order bit plane (S-1) to the lowest-order bit plane.

The image expansion unit 5 reads in the bit stream in successive fashion and displays an image when code corresponding to each bit plane has been decoded.

If only the high-order bit planes have been decoded in the case of the R (red) and G (green) planes, only the overall features of the image (the contour of the optic nerve head, the larger arteries and veins, etc.) will be displayed. However, image quality improves in stages as the low-order bit planes are decoded. In a case where the quantization step $\Delta$ is "1" in the quantizer 11, the image displayed at the stage where all bit planes have been decoded will be entirely the same as the original image.

In the case of the B (blue) planes, image quality gradually improves as the decoding processing of each bit plane progresses, However, the optic nerve head that was the designated region at the time of encoding is decoded with a high image quality at a stage earlier than the other portions.

The reason for this is as follows: The quantization indices that belong to the region designated by the region designation unit 8 are shifted up in the quantizer 11 at the time of quantization. At the decoding of a bit plane, therefore, the quantization indices are decoded at an earlier time than in the other portions of the image.

Furthermore, when all bit planes have been decoded, the designated region and the other portions of the image are identical in terms of image quality. However, in a case where decoding is suspended in mid-course, an image in which the designated region has been reconstructed to have an image quality higher than other portions will be obtained.

In the embodiment described above, it is possible to reduce the amount of encoded data processed and, as a result, control the compression rate, by limiting (neglecting) low-order bit planes decoded in the entropy decoder 14. By adopting such an expedient, it is possible to obtain a decoded image of a desired image quality from only the encoded data of the required amount. In a case where the value of the quantization step $\Delta$ at the time of encoding is "1" and all bit planes are decoded at the time of decoding, it is possible to realize reversible encoding/decoding in which the reconstructed image agrees with the original image.

If the function for limiting the low-order bit planes is utilized in the case of the B (blue) plane, only bits corresponding to the designated region shown in FIGS. 6A to 6C are included in a quantity larger than that of other areas in the code sequence that is to be decoded. The end result, therefore, is that it is possible to obtain an effect similar to the decoding of data obtained by encoding only a designated region at a low compression rate and as an image having a high image quality.

As for the R (red) and G (green) planes, an arrangement may be adopted in which the amount of data is reduced by compressing the optic nerve head portion of the image at a high compression rate by designating a region other than optic nerve head. This is contrary to the case of the B (blue) plane.

In the description rendered above, the image signal that has been encoded by the image compression unit 3 is output to the image recording unit 4. However, in view of the growing use of networks in the medical industry, an arrangement may be adopted in which the image signal that has been encoded by the image compression unit 3 is output to a LAN (Large-Area Network) in a hospital, for example, and the image expansion unit 5 decodes the image signal sent by the LAN. Furthermore, it goes without saying that the LAN may be adopted as part of the WWW (World-Wide Web) for the purpose of supporting remote medical treatment.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiments.

Thus, in accordance with this embodiment as described above, the compression rate of the image of the optic nerve head in a color fundus image and the compression rate of other regions in this image are made different from each other in B (blue) planes among the R, G, B color components that constitute the color fundus image signal. By making the compression rate only of the image of the optic nerve head lower than that of the other regions, the amount of compressed image information is reduced by raising the compression rate of the image overall, as a result of which the compressed image information can be recorded efficiently on a medium such as a magnetic or magneto-optic disk.

Further, by using a wavelet transform when encoding the image information, the image information representing the optic nerve head, which is the region of interest, can be designated with ease. Furthermore, it is possible to provide a hierarchical encoding technique that exhibits excellent compression efficiency.

Thus, in accordance with the present invention, as described above, a designated region of an image can be encoded at a low compression rate and other regions at a high compression rate to thereby raise the encoding efficiency of the image as a whole.

Further, in accordance with the present invention, a first color component of a designated region of an image can be encoded at a low compression rate and other color components at a high compression rate to thereby raise the encoding efficiency of the image as a whole.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for encoding image information, comprising:

input means for inputting image information including a first color component which indicates a first color, and a second color component which indicates a second color;

designation means for designating a prescribed region in the image information; and encoding means for encoding the first color component in the prescribed region designated by the designation means, encoding the first color component in a region other than the prescribed region at a compression rate higher than the compression rate of the first color component in the prescribed region, and encoding the second color component in all regions at a compression rate higher than that used for the first color component in the prescribed region.

2. The apparatus according to claim 1, wherein the first color component is a blue color component and the second color component is a green color component.

3. The apparatus according to claim 1, wherein the image information corresponds to a fundus image and the prescribed region contains an optic nerve head in the fundus image.

4. The apparatus according to claim 1, wherein said designation means extracts and designates the prescribed region automatically based upon a luminance difference in the image information.

5. The apparatus according to claim 1, wherein said encoding means encodes the prescribed region and a region other than the prescribed region at equal compression rates with regard to a third color component included in the plurality of color components.

6. The apparatus according to claim 5, wherein the third color component is a red color component.

7. The apparatus according to claim 1, wherein said encoding means uses a wavelet transform.

8. The apparatus according to claim 7, further comprising quantization means for quantizing transformation coefficients obtained by the wavelet transform, wherein a change in the compression rate of said encoding means is made by changing quantization parameters in said quantization means.

9. An image processing method for encoding image information, comprising:

an input step, of inputting image information including a first color component which indicates a first color, and a second color component which indicates a second color;

a designation step, of designating a prescribed region in the image information; and an encoding step, of encoding the first color component in the prescribed region designated by the designation means, encoding first color component in a region other than the prescribed region at a compression rate higher than the compression rate of the first color component in the prescribed region, and encoding the second color component in all regions at a compression rate higher than that used for the first color component in the prescribed region.

10. The method according to claim 9, wherein the first color component is a blue color component and the second color component is a green color component.

11. The method according to claim 9, wherein the image information corresponds to a fundus image and the prescribed region contains an optic nerve head in the fundus image.

12. The method according to claim 9, wherein said designation step extracts and designates the prescribed region automatically based upon a luminance difference in the image information.

13. The method according, to claim 9, wherein said encoding step encodes the prescribed region and a region other than the prescribed region at equal compression rates with regard to a third color component included in the plurality of color components.

14. The method according to claim 13, wherein the third color component is a red color component.

15. The method according to claim 1, wherein said encoding step uses a wavelet transform.

16. The method according to claim 15, further comprising a quantization step of quantizing transformation coefficients obtained by the wavelet transform, wherein a change in the compression rate of said encoding means is made by changing quantization parameters in said quantization means.

17. A computer-readable storage medium storing a program for executing the image processing method set forth in claim 9.

18. An image processing apparatus for encoding image information, comprising:

input means for inputting image information including a first color component which indicates a first color, and a second color component which indicates a second color;

designation means for designating a prescribed region in the image information; and encoding means for encoding the first color component in the prescribed region designated by the designation means, encoding the first color component in a region other than the prescribed region so as to complete decoding of encoded data of the first color component that region other than the prescribed region, and encoding the second color component in all regions so as to complete decoding of encoded data of the first color component in the prescribed region prior to decoding encoded data of the second color component in all regions.

19. An image processing method for encoding image information, comprising the steps of:

inputting image information including a first color component which indicates a first color, and a second color component which indicates a second color;

designating a prescribed region in the image information; and encoding the first color component in the prescribed region designated by the designation means, encoding the first color component in a region other than the prescribed region so as to complete decoding of encoded data of the first color component that region other than the prescribed region, and encoding the second color component in all regions so as to complete decoding of encoded data of the first color component in the prescribed region prior to decoding encoded data of the second color component in all regions.

* * * * *

UNITED STATES PATENT AND TRADEMARK OFFICE
CERTIFICATE OF CORRECTION

| | |
|---|---|
| PATENT NO. : 6,832,001 B1 | Page 1 of 2 |
| DATED : December 14, 2001 | |
| INVENTOR(S) : Kenichi Kashiwagi | |

It is certified that error appears in the above-identified patent and that said Letters Patent is hereby corrected as shown below:

<u>Title page,</u>
Item [56], References Cited, FOREIGN PATENT DOCUMENTS,
"JP      7-136121      9/1994         A61B/3/12" should read
-- JP    7-136121      9/1995         A61B/3/12 --.

<u>Column 2,</u>
Line 23, "met hod" should read -- method --; and
Line 53, "diagram" should read -- diagrams --.

<u>Column 3,</u>
Line 20, "FIGS. 15A, 15B" should read -- FIGS. 15A and 15B --.

<u>Column 4,</u>
Line 28, "is" should read -- are --.

<u>Column 5,</u>
Line 10, "designated" should read -- designated region --;
Line 17, "in" should read -- is --; and
Line 22, "a" should read -- as --.

<u>Column 6,</u>
Line 34, "S=ceil[$\log_2$ {abs(M))}]" should read -- S=ceil[$\log_2$ {abs(M)}] --.

Figure 8C:
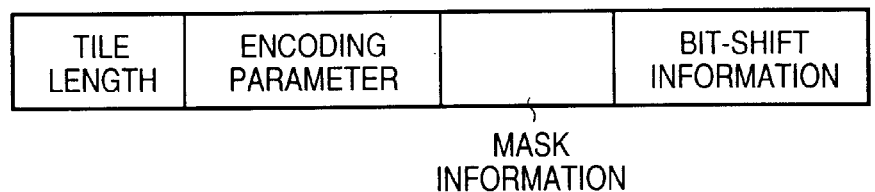
Figure 8D:
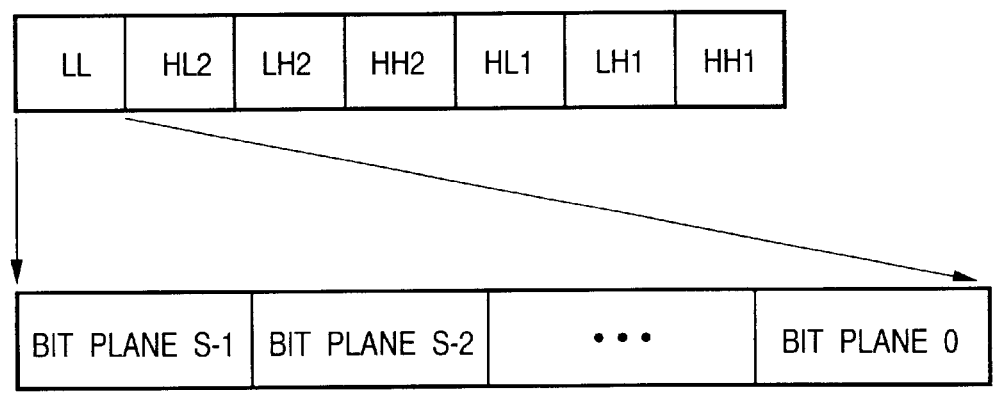

<u>Column 7,</u>
Line 4, "FIG. 5C." should read -- FIG. 8C. --;
Line 15, "FIG. 5D" should read -- FIG. 8D --;
Line 22, "4B," should read -- 14B, --; and
Line 67, "step A." should read -- step Δ. --.

<u>Column 9,</u>
Line 28, "unit 604." should read -- unit 16. --.

UNITED STATES PATENT AND TRADEMARK OFFICE
CERTIFICATE OF CORRECTION

PATENT NO. : 6,832,001 B1
DATED : December 14, 2001
INVENTOR(S) : Kenichi Kashiwagi It is certified that error appears in the above-identified patent and that said Letters Patent is hereby corrected as shown below:

<u>Column 14,</u>
Line 5, "claim 1," should read -- claims 9, --; and
Lines 30 and 47, "that" should read -- in that --.

Signed and Sealed this

Eighteenth Day of April, 2006

JON W. DUDAS
*Director of the United States Patent and Trademark Office*

UNITED STATES PATENT AND TRADEMARK OFFICE
CERTIFICATE OF CORRECTION

PATENT NO. : 6,832,001 B1
APPLICATION NO. : 09/712269
DATED : December 14, 2004
INVENTOR(S) : Kenichi Kashiwagi It is certified that error appears in the above-identified patent and that said Letters Patent is hereby corrected as shown below:

<u>Title page,</u>
Item [56], References Cited, FOREIGN PATENT DOCUMENTS,
"JP   7-136121   9/1994   A61B/3/12" should read
-- JP   7-136121   9/1995   A61B/3/12 --.

<u>Column 2,</u>
Line 23, "met hod" should read -- method --; and
Line 53, "diagram" should read -- diagrams --.

<u>Column 3,</u>
Line 20, "FIGS. 15A, 15B" should read -- FIGS. 15A and 15B --.

<u>Column 4,</u>
Line 28, "is" should read -- are --.

<u>Column 5,</u>
Line 10, "designated" should read -- designated region --;
Line 17, "in" should read -- is --; and
Line 22, "a" should read -- as --.

<u>Column 6,</u>
Line 34, "$S=\mathrm{ceil}[\log_2\{\mathrm{abs}(M))\}]$" should read -- $S=\mathrm{ceil}[\log_2\{\mathrm{abs}(M)\}]$ --.

<u>Column 7,</u>
Line 4, "FIG. 5C." should read -- FIG. 8C. --;
Line 15, "FIG. 5D" should read -- FIG. 8D --;
Line 22, "4B," should read -- 14B, --; and
Line 67, "step A." should read -- step Δ. --.

<u>Column 9,</u>
Line 28, "unit 604." should read -- unit 16. --.

UNITED STATES PATENT AND TRADEMARK OFFICE
CERTIFICATE OF CORRECTION

PATENT NO. : 6,832,001 B1
APPLICATION NO. : 09/712269
DATED : December 14, 2004
INVENTOR(S) : Kenichi Kashiwagi It is certified that error appears in the above-identified patent and that said Letters Patent is hereby corrected as shown below:

Column 14,
Line 5, "claim 1," should read -- claims 9, --; and
Lines 30 and 47, "that" should read -- in that --.

This certificate supersedes Certificate of Correction issued April 18, 2006.

Signed and Sealed this

Eighth Day of August, 2006

JON W. DUDAS
*Director of the United States Patent and Trademark Office*